United States Patent [19]

Burkholder

[11] 3,741,368
[45] June 26, 1973

[54] EGG PACKING MACHINE
[75] Inventor: Harvey Z. Burkholder, Ephreta, Pa.
[73] Assignee: U.S. Industries, Inc., New York, N.Y.
[22] Filed: Mar. 11, 1971
[21] Appl. No.: 123,430

Related U.S. Application Data
[62] Division of Ser. No. 863,893, Oct. 6, 1969.

[52] U.S. Cl. ................................. 198/37, 198/30
[51] Int. Cl. ............................................ B65g 43/08
[58] Field of Search ...................... 198/30, 37, 232, 198/32

[56] References Cited
UNITED STATES PATENTS
3,311,216   3/1967   Jones .................................... 198/30
3,623,591   11/1971  Koch ..................................... 198/30
  713,775   11/1902  Kuehnrich ............................ 198/232

Primary Examiner—Richard E. Aegerter
Attorney—Price, Heneveld, Huizenga & Cooper

[57] ABSTRACT

An improved egg packing apparatus orienting eggs into columns and rows so that a carton can be packed by vacuum lifting the eggs positioned with the pointed end downward. To insure that each row is filled as it advances into the machine, a vacuum switch is actuated when vacuum builds up due to the closing of openings to the atmosphere by the presence of an egg on a spring-biased hinged platform positioned in each column adjacent to an accumulating table which is delivering the eggs to the apparatus. Also, a gate otherwise blocking the egg on the platform is cam-actuated out of the way when the filled row is advanced by engaging rollers.

8 Claims, 9 Drawing Figures

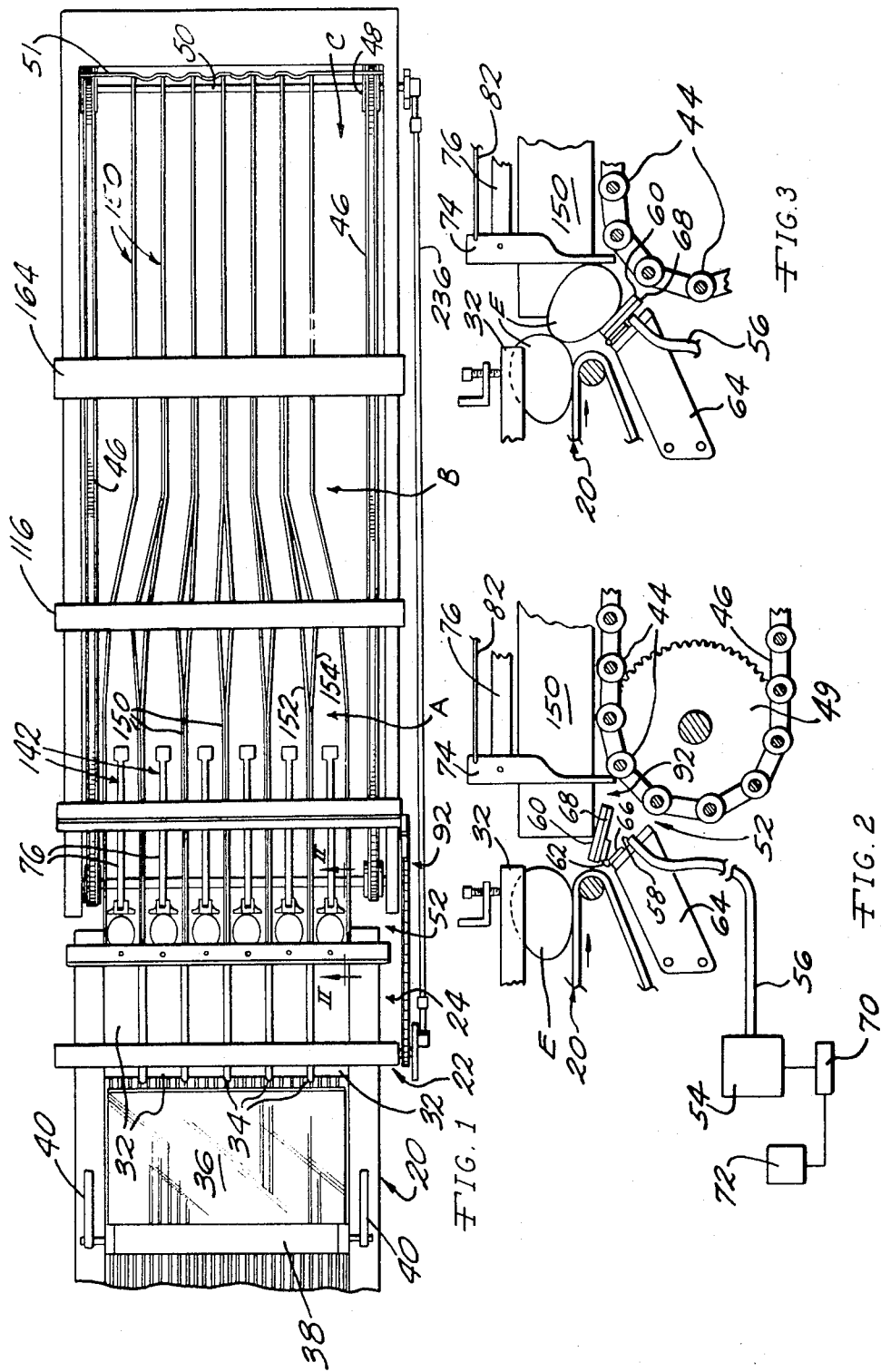

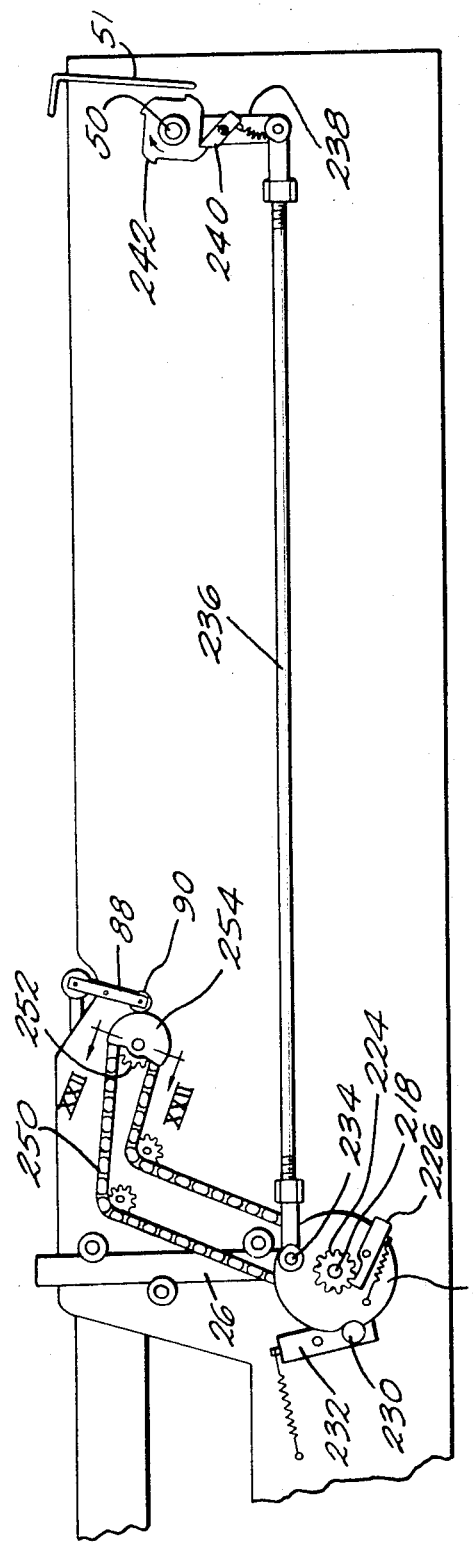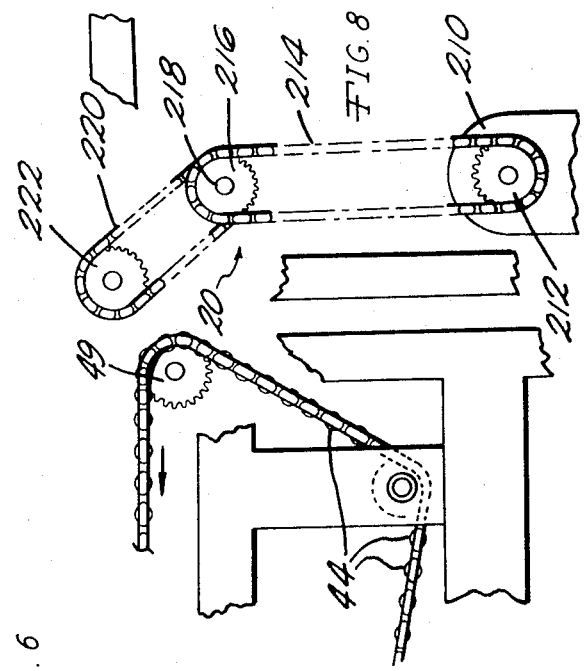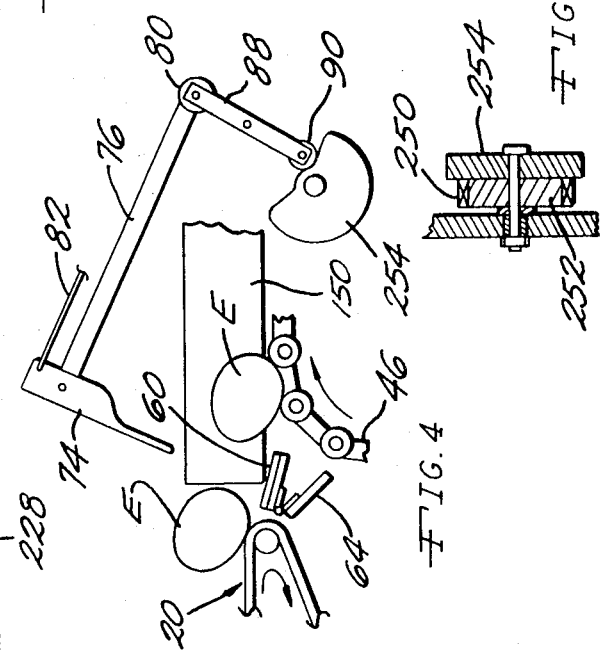

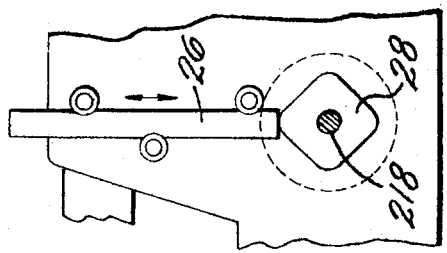
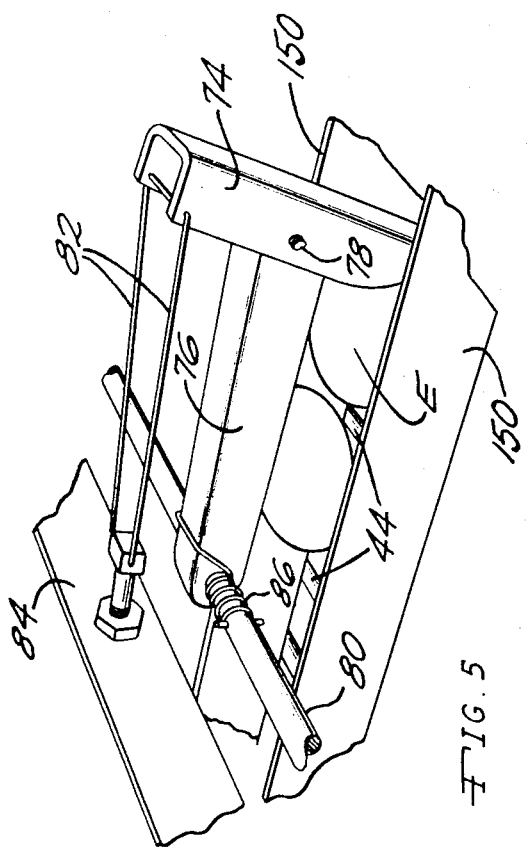

3,741,368

EGG PACKING MACHINE

This application is a divisional application of U.S. application Ser. No. 863,893, filed Oct. 6, 1969.

BACKGROUND OF THE INVENTION

A number of egg packing machines have been constructed in the past for taking randomly oriented eggs and automatically arranging them and packing them in egg cartons after which the eggs are sold. One example of such a machine is disclosed in U.S. Pat. No. 3,311,216, the machine disclosing therein an accumulating table, means for forming columns of eggs at the exit end of the table, means for advancing the columns one row at a time, means for insuring that the advancing means are operative only when each row is filled, means for orienting the eggs in a prescribed position, and means for removing the eggs so oriented and placing them in an egg carton. The particular means disclosed for accomplishing these functions work satisfactorily but it has been found that in some instances improvements can be made. It is to these improvements that the instant application is directed. For example, the apparatus disclosed in the aforesaid patent utilizes a star wheel for controlling the advancement of the rows, the wheel being counter-balanced by a weight which, when the wheel has received an egg, is pivoted out of the way of a light beam. When all the weights are so pivoted, the beam is thereby allowed to activate a photo cell. The activation of the photo cell actuates the motor which indexes the rows forward. Such a system has a disadvantage in that it is difficult to arrange it so that the system will operate if less than all of the columns are being utilized to collect eggs. Thus, even though it is not desired that one of the columns have eggs therein because a shortened carton is being utilized, nevertheless the star wheel in that column, by means of the lack of an egg weighing it down, will continue to interrupt the light beam so as to prevent the machine from being actuated.

SUMMARY OF THE INVENTION

This invention relates to an egg packing apparatus similar to that described above as disclosed in the aforesaid Patent No. 3,311,216, the invention providing improvements in the areas of the means controlling the advance of the columns one row at a time.

Accordingly, it is an object of the invention to provide an improved egg-packing apparatus wherein the control of the advancing of the eggs row-by-row can be adjusted so as to accommodate fewer columns than there are actual spaces for.

Other objects and advantages will become apparent upon reference to the following drawings and detailed discussion.

BRIEF DESCRIPTION OF THE DRAWINGS

FIG. 1 is a fragmentary plan view with portions broken away of the apparatus constructed in accordance with the invention;

FIGS. 2 through 4 are partially schematic fragmentary side elevational views illustrating the stages through which the control means for the advancing means proceeds;

FIG. 5 is a perspective view of the gate utilized in the control of the advancing means;

FIG. 6 is a fragmentary side elevational view of the apparatus illustrated in FIG. 1;

FIG. 7 is a fragmentary side elevational view similar to FIG. 6 but illustrating only the drive train for the de-jammer plow;

FIG. 8 is a fragmentary partially broken away side elevational view similar to that illustrated in FIG. 6 but taken from the opposite side and;

FIG. 9 is a fragmentary sectional view taken along the line XXII—XXII of FIG. 6.

DESCRIPTION OF THE PREFERRED EMBODIMENT

The invention relates to an improvement of an egg-packing machine to which eggs are supplied by an accumulating table 20 which conventionally utilizes a de-jammer plow 22 at the exit end 24 of the accumulating table, the plow being reciprocated up and down by means of a bar 26 which rides on a cam 28 driven by a drive shaft 218. Any one of a number of accumulating tables can be utilized, such as the table disclosed in the aforesaid Patent No. 3,311,216 or the accumulating table disclosed in my copending application Ser. No. 860,193, filed Sept. 23, 1969, which application has a common assignee with the instant application and has since issued as U.S. Pat. No. 3,635,328. In case of the latter, a hold-down cover 32 can be utilized in position with the de-jammer plow to prevent build-up of eggs in the vertical direction within the de-jammer plow. Because of the spaced ribs 34 forming the de-jammer plow, the columns through which the eggs are to move are first formed at this point. To further prevent eggs from piling up behind the de-jammer plow, a plexiglass sheet 36 is cantilevered from a pivot bar 38 which has an arm 40 resting on a micro-switch, so that if the plexiglass sheet rises due to the build-up of eggs, the micro-switch under the arm 40 is released, thereby turning off the accumulating table.

The remainder of the apparatus performs the following functions. Once formed in columns, the eggs are released from the accumulating table 20 to the remainder of the egg-packing apparatus one row at a time, the row being released only when all of the columns have an egg therein. The particular control for accomplishing this is discussed hereinafter. Thereafter each row of eggs is moved through the egg-packing machine a distance corresponding to a new row, as each new row is fed into the apparatus. The indexing of each row through the rest of the machine is accomplished by conventional rollers 44 which are rotatably mounted on chains 46 at both sides of the egg-packing apparatus. The chains 46 are driven by a sprocket 48 mounted on a drive shaft 50 at one end of the machine, which drive shaft is actuated by a drive train hereinafter discussed. The chain rides over idler sprockets 49 at the initiating end of the egg-packing machine. As the columns of eggs move through the rest of the egg-packing apparatus, the columns are maintained by fencing strips generally indicated by numerals 150, the strips gradually converging together from a station identified as "A" through an intermediate station identified as "B" and finally to the completely oriented station identified as "C". The particular structure of the fencing strips and the means for orienting the eggs within the columns formed by the fencing strips are not described in detail since they are specifically described in the parent application now issued as U.S. Pat. No. 3,635,328 incorporated herein by reference. Once the eggs reach the station C, the proper number of rows are lifted out by a vacuum lift head 200, which lift head can be automatically guided and controlled or it can be operated by hand as shown in FIG. 15. A stop bar 51 is activated when station C fills up, thus terminating the indexing mechanism.

CONTROL OF THE ADVANCING ROLLERS

In accordance with the invention, the apparatus incorporates an improved means for controlling the advancing of the eggs one row at a time through the columns formed by the strips 150 in the following manner. Referring to FIGS. 2 through 4, as the egg E leaves the accumulating table 20 and passes out from underneath the hold-down cover 32, it falls into a controlling station 52 which utilizes a conventional source of vacuum 54 connected by a vacuum hose 56 to a point at an open tube end 58, the open tube end 58 subjecting the vacuum hose 56 to the atmosphere. There is an open tube end 58 in line with each column formed by the partitions 34. To close off the open tube end 58 from the atmosphere when an egg has entered the controlling station 52, a receiving means comprising a platform 60 is hingedly attached at 62 to a plate 64 mounted to the frame of the egg-packing apparatus. The platform 60 is biased away from the opening 58 of the vacuum hose by a spring 66 attached to the hinged point 62. To complete the closure of the open tube end 58 when the platform 60 is depressed by the weight of an egg against the action of the spring 66, a felt pad 68 is fixed to the bottom of the platform 60. As the felt pads close off the open ends 58, the vacuum drawn by the vacuum motor 54 increases to a point wherein an adjustable vacuum switch 70 is triggered, thereby actuating a solenoid 72 which in turn engages the drive train as hereinafter explained. Because the vacuum switch, which is conventional as is the solenoid 72, is adjustable, the switch can be set for varying degrees of vacuum depending upon how many columns are being utilized in the packing apparatus. Thus, if the apparatus has a total capacity for six columns, but the carton to be packed has only four columns, two of the columns can be blocked off at the de-jammer plow entry, thereby reducing the effective number of columns to four. The vacuum switch 70 is simply adjusted to trigger when less vacuum is drawn, the lower vacuum being due to the fact that two of the lines will still be open to the atmosphere.

To prevent an egg on the platform 60 from prematurely sliding down into the space formed by two rollers 44 adjacent to the station 52 (FIG. 3), a gate 74 is mounted to depend downwardly between the two rollers creating the opening into which the egg is to be moved when the indexing occurs, the egg abutting the gate 74 prior to the indexing step. The gate (FIG. 5) is mounted by a lever 76 pivotally mounted at 78 to the gate at one end thereof, the other end being journalled to a rocker shaft 80 which rotates the lever 76 and therefore the gate 74 upwardly at the proper moment so as to allow the egg in the controlling station 52 to clear the gate and be indexed into the apparatus via the two rollers 44 (FIG. 4). The gate is maintained in an orientation slightly inclined from the vertical by guide wires 82 attached to a bar 84 (FIG. 5) mounted on the frame of the apparatus, the wires passing through holes in the top of the gate 74. The lever 76 and gate 74 are biased into the blocking or hold-back position by a spring 86 wound around the rocker shaft 80 and over the top of the lever 76. The rocker shaft 80 is rocked through an arc, in response to the indication by the controlling station that indexing can take place, by a pivot arm 88 attached at one end to the rocker shaft 80, the other end of the arm 88 rotatably mounting a cam follower 90 which is operated by a cam in a manner hereinafter discussed.

CONTROLS

The actuation of the various parts described above is accomplished as follows.

A motor 210 continuously drives a sprocket 212 which engages a chain 214 driving in turn another sprocket 216. The sprocket 216 is mounted on a drive shaft 218, which shaft projects through the entire width of the machine. Mounted on the shaft 218 is a second sprocket which drives via a chain 220 an additional sprocket 222 which is utilized to drive the accumulating table. On the other side of the machine, a ratchet wheel 224 is fixed to the end of the shaft 218. To periodically engage the ratchet wheel 224, a pawl 226 is pivotally mounted on a disc 228 which freely rotates with respect to the shaft 218. In its inoperative position, the disc 218 is held in position by a detent 230 engaged by a spring-biased lever 232. To periodically cause the advancement of the rollers 44 by rotating the drive shaft 50, a throw-arm 234 eccentrically mounted on the disc 228 is threaded to a rod 236 the other end of which engages a lever 238. Mounted on the lever 238 is a pawl 240 which in turn engages another ratchet wheel 242 mounted on the drive shaft 50. To complete the engagement of the disc 228 with the constantly rotating shaft 218, the solenoid 72 causes the pawl 226 which is spring-biased normally out of engagement with the ratchet wheel 224 to engage the ratchet, thereby causing the disc 228 to rotate until the pawl 226 is disengaged by means of the disengagement of the solenoid 72 caused by the vacuum switch 70. As the disc 228 rotates, the arm 236 causes the ratchet wheel 242 to rotate, thereby advancing a row of eggs one row at a time. To operate the raising of the gate 74 in sequence with the indexing of the rollers 44, still another sprocket (not shown) is mounted on the drive shaft 218 inside of the disc 228, the sprocket engaging a chain 250 which in turn engages a freely rotating sprocket 252 mounted on the frame of the machine. To engage the cam follower 90, a cam 254 is fixed to the sprocket 252 (FIG. 22).

Certain obvious modifications providing the equivalent function will be readily apparent to one skilled in the art. For example, the star wheel utilized in station B need not be five-pointed, but for example could be four-pointed provided the spacing of the points is such that it prevents the eggs from tipping over between the rollers 44 and will allow the star wheel to rotate so that as each row advances the following fingers of the star wheel engage between the following rollers defining the next row of eggs.

The embodiments of the invention in which an exclusive property or privilege is claimed are defined as follows.

1. In an egg-packing machine comprising an accumulating table having an exit end, means for forming columns of eggs at said exit end, means for advancing said columns one row at a time, and means for controlling said advancing means so that the latter is operative only when each row is filled, the improvement comprising including in said controlling means a source of vacuum; means for connecting said source to a point in line with each said column at said exit end, said point being open to the atmosphere; and means for closing said point from the atmosphere when an egg has been delivered in said column from said exit end.

2. The improved egg-packing machine as defined in claim 1, wherein said closing means includes means for receiving an egg, said receiving means being hingedly mounted with respect to said point; means for biasing said receiving means above and away from said point; and said connecting means includes a vacuum hose open at one end so as to define said point.

3. The improved egg-packing machine as defined in claim 2, wherein said receiving means includes a platform and means for closing said open end when said platform is pivoted against the action of said biasing means.

4. The improved egg-packing machine as defined in claim 3, wherein said open end closing means includes a felt backing attached to the bottom of said platform.

5. The improved egg-packing machine as defined in claim 1, wherein said controlling means further includes, as an improvement thereof, means for preventing eggs from prematurely moving beyond the delivered position which causes said closing means to be actuated.

6. The improved egg-packing machine as defined in claim 5, wherein said advancing means includes a plurality of rollers each adjacent pair of which defines one of said rows, and said preventing means includes a gate and means for mounting said gate so as to prevent the delivered egg from moving into position between two of said rollers.

7. The improved egg-packing machine as defined in claim 6, wherein said mounting means includes a lever and means on said lever for biasing said gate in the preventing position; and further including means for rotating said gate out of the path of the delivered egg while said rollers are simultaneously advanced one row.

8. The improved egg-packing machine as defined in claim 7, wherein said rotating means includes a rocker shaft and a cam, and means connecting said shaft to said cam, said lever being mounted on said shaft.

* * * * *